US012689252B2

(12) United States Patent (10) Patent No.: US 12,689,252 B2

Nakagawa et al. (45) Date of Patent: Jul. 21, 2026

(54) MAGNETIC MODULATION GEAR AND GEAR MOTOR

(71) Applicant: SUMITOMO HEAVY INDUSTRIES, LTD., Tokyo (JP)

(72) Inventors: Hiroki Nakagawa, Kanagawa (JP); Taizo Yamamoto, Kanagawa (JP); Takahiro Minari, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 173 days.

(21) Appl. No.: 18/432,331

(22) Filed: Feb. 5, 2024

(65) Prior Publication Data

US 2024/0178712 A1 May 30, 2024

Related U.S. Application Data

(63) Continuation of application No. PCT/JP2022/029936, filed on Aug. 4, 2022.

(30) Foreign Application Priority Data

Aug. 17, 2021 (JP) ................................. 2021-132720

(51) Int. Cl.
 *H02K 1/274* (2022.01)
 *H02K 1/30* (2006.01)
 *H02K 7/08* (2006.01)

(52) U.S. Cl.
 CPC .............. *H02K 1/274* (2013.01); *H02K 1/30* (2013.01); *H02K 7/083* (2013.01)

(58) Field of Classification Search
 CPC ............ H02K 1/27; H02K 1/274; H02K 1/28; H02K 1/30; H02K 7/083; H02K 7/00; H02K 1/00
 See application file for complete search history.

(56) References Cited

U.S. PATENT DOCUMENTS

| | | | | |
|---|---|---|---|---|
| 9,729,040 B2 * | 8/2017 | Sutani | .................. | H02K 49/102 |
| 2013/0002076 A1 * | 1/2013 | Iwasaki | ................ | H02K 49/102 |
| | | | | 310/103 |

(Continued)

FOREIGN PATENT DOCUMENTS

| | | | | |
|---|---|---|---|---|
| JP | 2012147513 A | * | 8/2012 | ........... H02K 49/102 |
| JP | 2013-011298 A | | 1/2013 | |

(Continued)

OTHER PUBLICATIONS

Machine Translation of JP 2016142407 A (Year: 2016).*
Machine Translation of JP 2012147513 A (Year: 2012).*

*Primary Examiner* — Alexander A Singh
*Assistant Examiner* — Charlie Frank Mann, Jr.
(74) *Attorney, Agent, or Firm* — Michael Best & Friedrich LLP

(57) ABSTRACT

A magnetic modulation gear includes a plurality of outer pole magnets arranged in a circumferential direction, a rotor that includes a plurality of magnetic pole pieces arranged in the circumferential direction on a radially inner side with respect to the outer pole magnets, a plurality of inner pole magnets arranged in the circumferential direction on a radially inner side with respect to the magnetic pole pieces, and a plurality of bearings that rotatably support the rotor, in which the plurality of bearings include one-side bearings located on one side in an axial direction with respect to the magnetic pole pieces, and a first bearing closest to the magnetic pole pieces, of the one-side bearings, is disposed within a region radially outward with respect to inner peripheral ends of the outer pole magnets, or within a region radially inward with respect to outer peripheral ends of the inner pole magnets.

6 Claims, 8 Drawing Sheets

(56)                 References Cited

U.S. PATENT DOCUMENTS

2017/0373582  A1    12/2017  Hawksworth et al.
2021/0265905  A1     8/2021  Jungmayr et al.

FOREIGN PATENT DOCUMENTS

JP         2016142407  A  *   8/2016
JP         2017-050943  A      3/2017
JP         2020-133790  A      8/2020
WO         2019/204848  A1    10/2019

* cited by examiner

MAGNETIC MODULATION GEAR AND GEAR MOTOR

CROSS-REFERENCE TO RELATED APPLICATIONS

This is a bypass continuation of International PCT Application No. PCT/JP2022/029936, filed on Aug. 4, 2022, which claims priority to Japanese Patent Application No. 2021-132720, filed on Aug. 17, 2021, which are incorporated by reference herein in their entirety.

BACKGROUND

Technical Field

Certain embodiments of the present invention relate to a magnetic modulation gear and a gear motor.

Description of Related Art

The related art discloses a magnetic modulation gear that includes a plurality of outer pole magnets and a plurality of inner pole magnets arranged in a circumferential direction, and a low speed rotor having a plurality of magnetic pole pieces arranged in the circumferential direction between the outer pole magnets and the inner pole magnets. The low speed rotor is supported by a plurality of bearings. Some of the plurality of bearings are disposed so as to overlap the magnetic pole piece when viewed in an axial direction.

SUMMARY

According to an embodiment of the present invention, there is provided a magnetic modulation gear including a plurality of outer pole magnets arranged in a circumferential direction, a rotor that includes a plurality of magnetic pole pieces arranged in the circumferential direction on an inner side in a radial direction with respect to the plurality of outer pole magnets, a plurality of inner pole magnets arranged in the circumferential direction on an inner side in the radial direction with respect to the plurality of magnetic pole pieces, and one or a plurality of bearings that support the rotor to be rotatable relative to the outer pole magnets or the inner pole magnets, in which the one or plurality of bearings include one-side bearings that are located on one side in an axial direction with respect to the plurality of magnetic pole pieces, and a first bearing closest to the magnetic pole pieces, of the one-side bearings, is disposed within a region outward in the radial direction with respect to inner peripheral ends of the plurality of outer pole magnets, or within a region inward in the radial direction with respect to outer peripheral ends of the plurality of inner pole magnets.

According to another embodiment of the present invention, there is provided a magnetic modulation gear including a plurality of outer pole magnets arranged in a circumferential direction, a rotor that includes a plurality of magnetic pole pieces arranged in the circumferential direction on an inner side in a radial direction with respect to the plurality of outer pole magnets, and a plurality of inner pole magnets arranged in the circumferential direction on an inner side in the radial direction with respect to the plurality of magnetic pole pieces, in which a magnetic body having an axial dimension larger than 0.5 mm is not provided between inner peripheral ends of the plurality of outer pole magnets and outer peripheral ends of the plurality of inner pole magnets in the radial direction and in a region in which a distance from the magnetic pole pieces in an axial direction is less than 3 mm.

According to still another embodiment of the present invention, there is provided a gear motor including an electric motor, and the above magnetic modulation gear that receives power from the electric motor.

DETAILED DESCRIPTION

The magnetic modulation gear of the related art described above is disadvantageous in that a magnetic flux leaking in the axial direction from between the outer pole magnet, the magnetic pole piece, and the inner pole magnet is drawn into the bearing, which is a magnetic body, resulting in the occurrence of a loss. The loss reduces the torque and efficiency of the magnetic modulation gear.

It is desirable to provide a magnetic modulation gear and a gear motor in which a decrease in torque and efficiency due to a leakage magnetic flux can be suppressed.

Hereinafter, each embodiment of the present invention will be described in detail with reference to the drawings.

Figure 1:
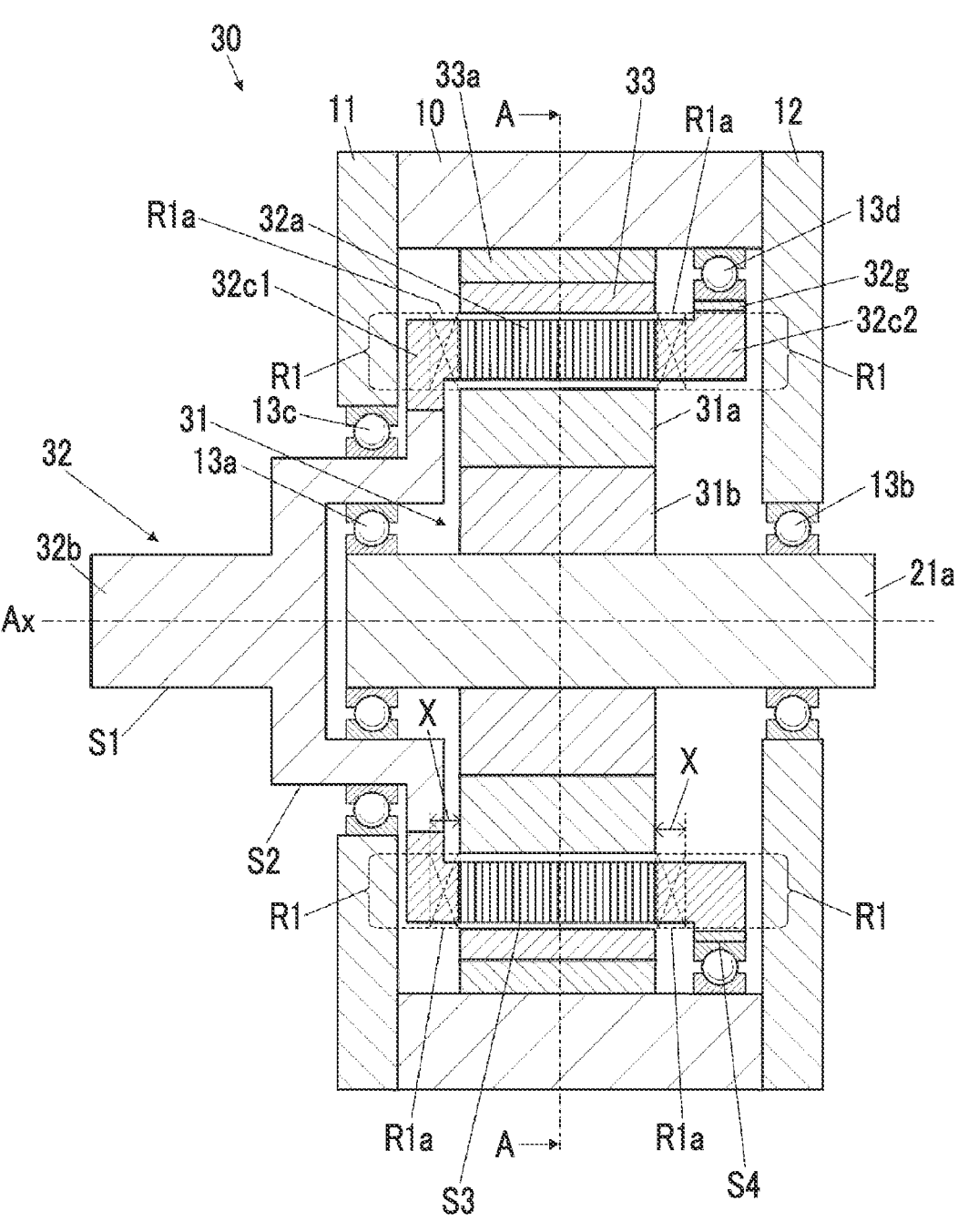
FIG. 1 is a sectional view showing a magnetic modulation gear according to an embodiment of the present invention.
Figure 2:
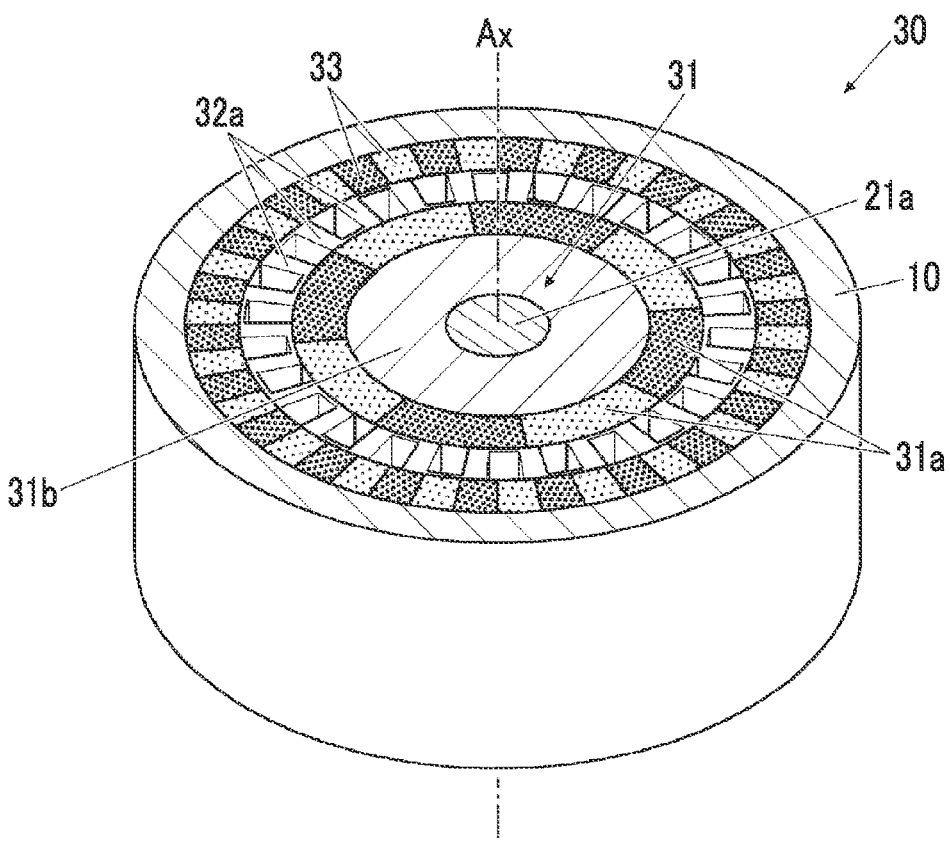
FIG. 2 is a perspective view showing a cross section of the magnetic modulation gear of FIG. 1.

FIG. 1 is a sectional view showing a magnetic modulation gear according to an embodiment of the present invention. FIG. 2 is a perspective view showing a cross section of the magnetic modulation gear of FIG. 1. The cross section in FIG. 2 shows a cross section taken along line A-A in FIG. 1. Hereinafter, the direction along a center axis Ax will be referred to as an axial direction, the direction perpendicular to the center axis Ax will be referred to as a radial direction, and the direction of rotation around the center axis Ax will be referred to as a circumferential direction. Further, the side where a shaft member 32b protrudes in the axial direction (the left side in the drawings) will be referred to as a load side, and the opposite side (the right side in the drawings) will be referred to as a counter load side.

A magnetic modulation gear 30 includes a high speed rotor 31, a low speed rotor 32, a plurality of outer pole magnets 33, a casing 10, a load-side cover 11, and a counter load-side cover 12.

The high speed rotor 31 includes a shaft 21a, a rotor yoke 31b, and a plurality of inner pole magnets 31a. Both axial end portions of the shaft 21a extend from the rotor yoke 31b, and these both end portions are supported by bearings 13a and 13b. The plurality of inner pole magnets 31a are, for example, permanent magnets such as neodymium magnets, are arranged in the circumferential direction such that the polarity directions are alternately different, and are attached to the outer peripheral surface of the rotor yoke 31b. Further, the plurality of inner pole magnets 31a may be integrated in a ring shape, or may be individually divided.

In the present embodiment, the low speed rotor 32 is configured to be stepped and hollow on the counter load side, and is disposed concentrically with the high speed rotor 31. The low speed rotor 32 includes a plurality of magnetic pole pieces (pole pieces) 32a disposed on the outer diameter side of the inner pole magnets 31a.

The magnetic pole piece 32a is made of a laminated steel sheet. The plurality of magnetic pole pieces 32a are disposed at predetermined intervals in the circumferential direction. The number of magnetic pole pieces 32a is the number of outer pole pairs (the number of pole pairs of the outer pole magnets 33)±the number of inner pole pairs (the number of pole pairs of the inner pole magnets 31a) and is generally the number of outer pole pairs+the number of inner pole pairs. Two magnetic pole pieces 32a adjacent to each other in the circumferential direction may be connected to each other by a thin connection portion or may be connected to each other through a non-magnetic body.

The low speed rotor 32 further includes the shaft member 32b located on the load side with respect to the magnetic pole pieces 32a. Further, the low speed rotor 32 includes an extension portion 32c1 that extends from the magnetic pole pieces 32a toward the load side, an extension portion 32c2 that extends from the magnetic pole pieces 32a toward the counter load side, and a ring member 32g mounted on an outer peripheral portion of the extension portion 32c2.

Although the shaft member 32b, the extension portions 32c1 and 32c2, and the ring member 32g form a shape in which the cross section shown in FIG. 1 is continuous over the entire circumference in the circumferential direction, a cutout may be included in a portion in the circumferential direction. The shaft member 32b and the ring member 32g may be made of a non-magnetic body such as stainless steel, or may be made of a steel-based magnetic body. The extension portions 32c1 and 32c2 are made of a material (a non-magnetic body and an insulating body) that does not have magnetism or conductivity, and may be made of resin.

The shaft member 32b is connected to the extension portion 32c1 on the load side, and the extension portion 32c1 on the load side and the extension portion 32c2 on the counter load side are joined to the plurality of magnetic pole pieces 32a. With such a configuration, the low speed rotor 32 that includes the shaft member 32b, the extension portion 32c1 on the load side, the plurality of magnetic pole pieces 32a, the extension portion 32c2 on the counter load side, and the ring member 32g is integrated, and the low speed rotor 32 rotates integrally. A portion on the load side of the shaft member 32b is exposed to the outside from the load-side cover 11 and is connected to a driven member (not shown).

The plurality of outer pole magnets 33 are concentrically disposed on the side of the outer diameters of the plurality of magnetic pole pieces 32a with a predetermined gap therebetween. The plurality of outer pole magnets 33 may be permanent magnets such as neodymium magnets, or may be electromagnets. The plurality of outer pole magnets 33 have a larger number of poles than the plurality of inner pole magnets 31a. The plurality of outer pole magnets 33 are arranged in the circumferential direction such that the polarity directions are alternately different, and are attached to the inner peripheral surface of the casing 10 through a yoke portion 33a (not shown in FIG. 2). The plurality of outer pole magnets 33 function as a stator. The plurality of outer pole magnets 33 may be integrated in a ring shape, or may be individually divided.

The axial lengths of the plurality of outer pole magnets 33, the axial lengths of the plurality of magnetic pole pieces 32a, and the axial lengths of the plurality of inner pole magnets 31a are substantially the same, and when viewed from the radial direction, the plurality of outer pole magnets 33, the plurality of magnetic pole pieces 32a, and the plurality of inner pole magnets 31a are disposed so as to substantially overlap.

The casing 10 covers the radially outer sides of the plurality of outer pole magnets 33, the plurality of magnetic pole pieces 32a, and the plurality of inner pole magnets 31a. The load-side cover 11 is connected to the casing 10 and covers the load sides of the plurality of outer pole magnets 33, the plurality of magnetic pole pieces 32a, and the plurality of inner pole magnets 31a. The counter load-side cover 12 is connected to the casing 10 and covers the counter load sides of the plurality of outer pole magnets 33, the plurality of magnetic pole pieces 32a, and the plurality of inner pole magnets 31a.

Bearing Structure

The magnetic modulation gear 30 further includes the bearings 13a and 13b that rotatably support the high speed rotor 31, and bearings 13a, 13c, and 13d that rotatably support the low speed rotor 32. The bearings 13a to 13d are ball bearings. However, various types of bearings such as roller bearings and tapered roller bearings may be applied.

The bearing 13a is fitted between the low speed rotor 32 and the high speed rotor 31, and rotatably supports the high speed rotor 31 with respect to the low speed rotor 32. Alternatively, the bearing 13a rotatably supports the low speed rotor 32 with respect to the high speed rotor 31. The bearing 13b is fitted between the counter load-side cover 12 and the high speed rotor 31 (the shaft 21a thereof). The bearing 13c is fitted between the load-side cover 11 and the low speed rotor 32 (the shaft member 32b thereof). The bearing 13d is fitted between the casing 10 and the low speed rotor 32 (the ring member 32g thereof).

Each of the bearings 13a to 13d has an outer ring, an inner ring, and rolling elements. The material for the outer ring, the inner ring, and the rolling element is a magnetic body (ferromagnetic body) such as steel. With such a material, high durability of the bearings 13*a* to 13*d* can be obtained, and a property of drawing in a magnetic flux is generated.
Operation of Magnetic Modulation Gear In the magnetic modulation gear 30, a deceleration operation in which rotating motion input to the high speed rotor 31 is decelerated and output from the low speed rotor 32, and a speed-up operation in which rotating motion input to the low speed rotor 32 is sped up and output from the high speed rotor 31 are possible.

In the deceleration operation, when rotating motion is input to the high speed rotor 31 from the outside, the plurality of inner pole magnets 31*a* included in the high speed rotor 31 rotate around the center axis Ax. Then, a rotating magnetic flux of the inner pole magnet 31*a* passes through the plurality of magnetic pole pieces 32*a*, thereby being modulated into a spatial magnetic flux containing a waveform component having the same wave number as the number of pole pairs of the outer pole magnets 33 in an outer side in the radial direction of the plurality of magnetic pole pieces 32*a* (the gap between the magnetic pole piece 32*a* and the outer pole magnet 33). Then, due to the interaction between the spatial magnetic flux and the magnetic flux of the outer pole magnet 33, rotation torque is transmitted to the low speed rotor 32 having the plurality of magnetic pole pieces 32*a*, and the low speed rotor 32 rotates at a lower rotation speed than the high speed rotor 31. The gear ratio (reduction ratio) at this time is (the number of magnetic pole pieces 32*a*/the number of pole pairs of the inner pole magnets 31*a*).

In the speed-up operation, when rotating motion is input to the low speed rotor 32 from the outside, the plurality of magnetic pole pieces 32*a* of the low speed rotor 32 rotate around the center axis Ax while drawing in the magnetic flux of the plurality of outer pole magnets 33. Then, the magnetic flux of the outer pole magnet 33 is modulated into a spatial magnetic flux containing a waveform component having the same wave number as the number of pole pairs of the inner pole magnets 31*a* in an inner side in the radial direction of the plurality of magnetic pole pieces 32*a* (the gap between the magnetic pole piece 32*a* and the inner pole magnet 31*a*). Then, due to the interaction between the spatial magnetic flux and the magnetic flux of the inner pole magnet 31*a*, rotation torque is transmitted to the high speed rotor 31 having the plurality of inner pole magnets 31*a*, and the high speed rotor 31 rotates at a higher rotation speed than the low speed rotor 32. The gear ratio (speed increase ratio) at this time is (the number of pole pairs of the inner pole magnets 31*a*/the number of magnetic pole pieces 32*a*).

In FIG. 1, a structure in which the outer pole magnets 33 are fixed is shown. However, a configuration may be adopted in which the low speed rotor 32 having the plurality of magnetic pole pieces 32*a* is fixed, the plurality of outer pole magnets 33 are rotatably supported, and decelerated rotating motion is output through the plurality of outer pole magnets 33. Even in this case, a configuration is made in which the low speed rotor 32 rotates relative to the plurality of outer pole magnets 33 and also rotates relative to the high speed rotor 31.
Change in Characteristic due to Disposition of Magnetic BODY Subsequently, changes in the torque and efficiency of the magnetic modulation gear 30 in a case where a magnetic body is disposed near the magnetic pole piece 32*a* will be described.

Figure 3A:
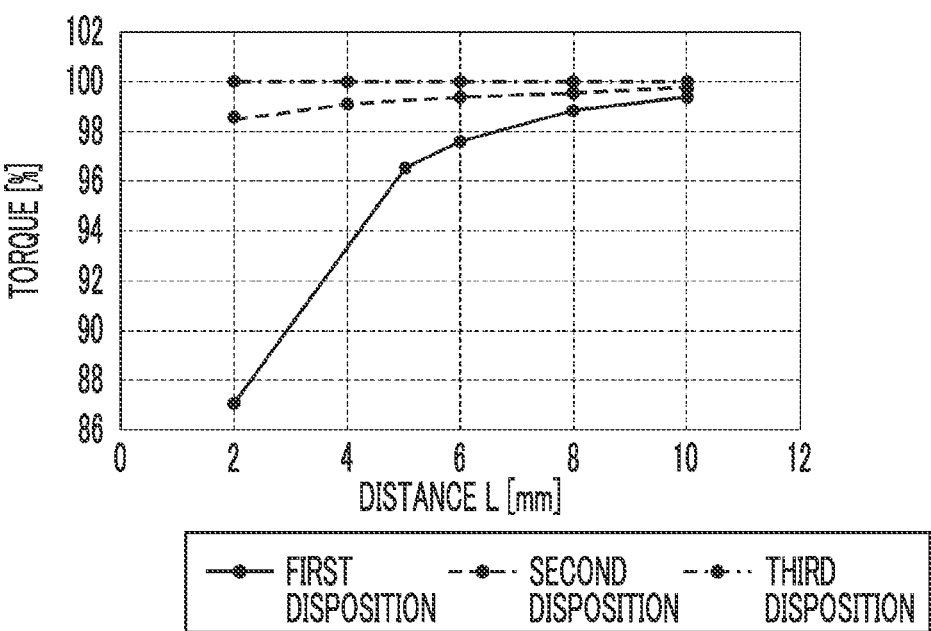
FIG. 3A is a graph showing a change in torque characteristic according to disposition of a magnetic body.
Figure 3B:
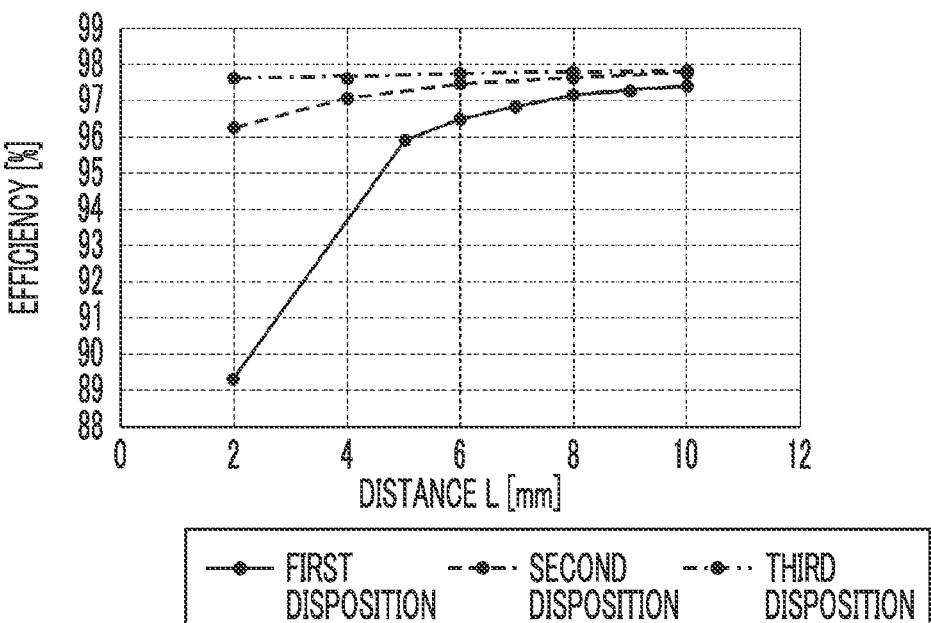
FIG. 3B is a graph showing a change in efficiency characteristic according to the disposition of the magnetic body.
Figure 4A:
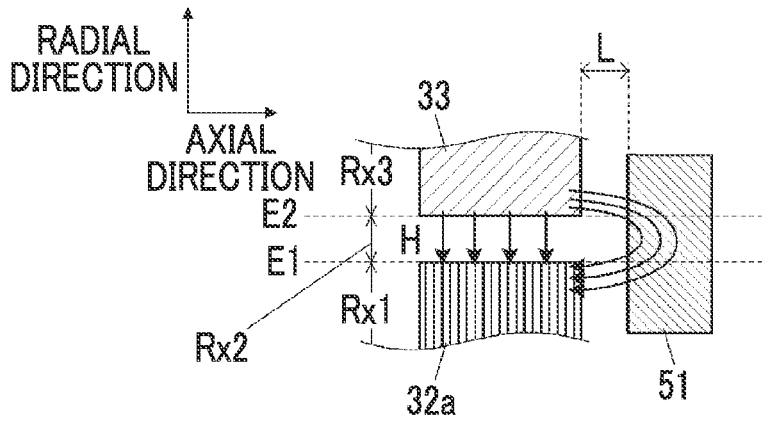
FIG. 4A is a diagram showing characteristic analysis conditions and shows first disposition of the magnetic body.
Figure 4B:
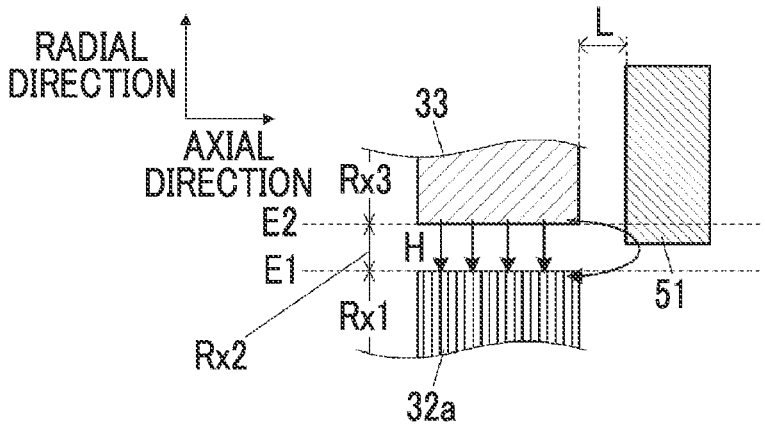
FIG. 4B is a diagram showing characteristic analysis conditions and shows second disposition of the magnetic body.
Figure 4C:
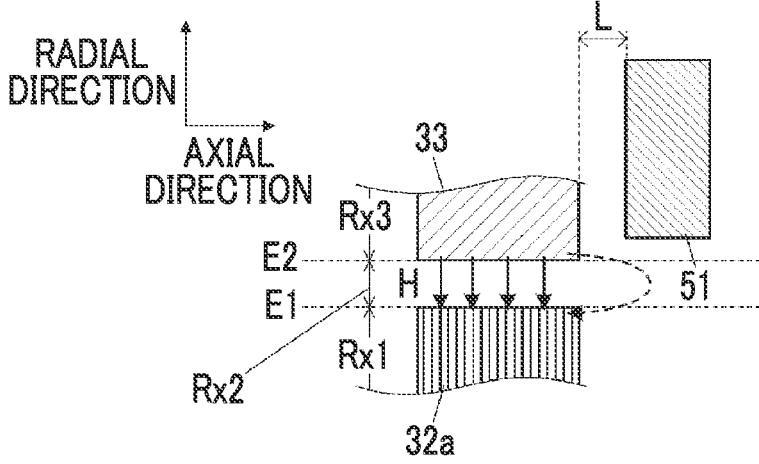
FIG. 4C is a diagram showing characteristic analysis conditions and shows third disposition of the magnetic body.

FIGS. 3A and 3B are graphs showing changes in characteristic according to disposition of a magnetic body, in which FIG. 3A shows a torque characteristic and FIG. 3B shows an efficiency characteristic. FIGS. 4A to 4C are diagrams showing characteristic analysis conditions, and respectively show first disposition to third disposition of a magnetic body 51. In the graphs of FIGS. 3A and 3B, graph lines for the first disposition to third disposition respectively represent the dispositions in the radial direction of the magnetic body 51 as shown in FIGS. 4A to 4C, and show characteristics when an axial distance L is changed. Torque is expressed as a ratio with a value when there is no magnetic body as 100%. The distance L indicates the distance in the axial direction between the magnetic pole piece 32*a* and the magnetic body 51.

FIGS. 4A to 4C show a part (above the center axis Ax) of a cross section taken along a vertical plane that includes the center axis Ax with respect to the outer pole magnet 33, the magnetic pole pieces 32*a*, and an arbitrary magnetic body 51. A magnetic flux H passes between the outer pole magnet 33 and the magnetic pole piece 32*a*. In the analysis, a ring-shaped ferromagnetic body centered on the center axis Ax was applied as the magnetic body 51.

In a case where the magnetic body 51 is disposed in the vicinity of the outer pole magnet 33 and the magnetic pole piece 32*a*, depending on the disposition thereof, a magnetic flux leaking from between the outer pole magnet 33 and the magnetic pole piece 32*a* is sometimes drawn into the magnetic body 51. Then, when a large amount of magnetic flux is drawn into the magnetic body 51, gap magnetic flux density between the magnetic pole piece 32*a* and the outer pole magnet 33 decreases, and transmission torque decreases. Therefore, the torque and efficiency of the magnetic modulation gear 30 decrease. Further, when a large amount of magnetic flux is drawn into the magnetic body 51, an iron loss (eddy current loss and hysteresis loss) due to a change in magnetic flux within the magnetic body 51 occurs, and the efficiency of the magnetic modulation gear 30 decreases.

As a result of the analysis, it was shown that in a case where the magnetic body 51 overlaps regions Rx1, Rx2, and Rx3 and is close to the magnetic pole piece 32*a* in the axial direction, the torque and efficiency of the magnetic modulation gear 30 greatly decrease. Further, it was shown that in a case where the magnetic body 51 does not overlap the region Rx1 but overlaps the regions Rx2 and Rx3 and is close to the magnetic pole piece 32*a* in the axial direction, the torque and the efficiency decrease. Further, it was shown that in a case where the magnetic body 51 is disposed within the region Rx3, even if the magnetic body 51 and the magnetic pole piece 32*a* are close to each other in the axial direction, a decrease in torque and efficiency is small. In the present specification, an expression "object A is disposed within a region B" means that the object A is disposed so as not to protrude from the region B.

The region Rx1 corresponds to a region between an outer peripheral end E1 and an inner peripheral end of the magnetic pole piece 32*a* in the radial direction. The region Rx2 corresponds to a region between an inner peripheral end E2 of the outer pole magnet 33 and the outer peripheral end E1 of the magnetic pole piece 32*a* in the radial direction. The region Rx3 corresponds to a region outward in the radial direction from the inner peripheral end E2 of the outer pole magnet 33.

The characteristics shown in the graphs of FIGS. 3A and 3B similarly appear even in a case where the magnetic body 51 is located near the inner pole magnet 31*a* and the magnetic pole piece 32*a*. That is, in a case where the magnetic body 51 overlaps the region Rx1, the region between the outer peripheral end of the inner pole magnet 31*a* and the inner peripheral end of the magnetic pole piece 32*a* in the radial direction, and the region inward in the radial direction with respect to the outer peripheral end of the inner pole magnet 31*a* and is close to the magnetic pole piece 32*a* in the axial direction, the torque and the efficiency greatly decrease. Further, in a case where the magnetic body 51 does not overlap the region Rx1 but overlaps the region between the outer peripheral end of the inner pole magnet 31*a* and the inner peripheral end of the magnetic pole piece 32*a* in the radial direction and the region inward in the radial direction with respect to the outer peripheral end of the inner pole magnet 31*a* and is close to the magnetic pole piece 32*a* in the axial direction, the torque and the efficiency decrease. Further, in a case where the magnetic body 51 is disposed within the region inward in the radial direction with respect to the outer peripheral end of the inner pole magnet 31*a*, even if the magnetic body 51 and the magnetic pole piece 32*a* are close to each other in the axial direction, a decrease in torque and efficiency is small.

The decrease in torque and efficiency due to the magnetic body 51 is due to a loss caused by the magnetic body 51 drawing in the magnetic flux H in the axial direction. Therefore, in a case where an axial thickness of the magnetic body 51 is as small as, for example, 0.1 mm, even if the magnetic body 51 is close to the magnetic pole piece 32*a*, a decrease in torque and efficiency does not much occur.

In view of the characteristics described above, the magnetic modulation gear 30 of the present embodiment has the following magnetic body disposition structures 1 to 4 in order to suppress a decrease in torque and efficiency.

Magnetic Body Disposition Structure 1

As shown in FIG. 1, the magnetic modulation gear 30 does not have a magnetic body having an axial dimension larger than 0.5 mm in a region R1*a*. The magnetic modulation gear 30 does not need to have a magnetic body having an axial dimension larger than 0.5 mm in a region R1. In other words, the magnetic body having an axial dimension larger than 0.5 mm is disposed outside the region R1*a*, or is disposed outside the region R1.

The term "magnetic body" means a ferromagnetic body, and is, for example, a part containing steel or the like. Examples of such a part include an outer ring, an inner ring, or a rolling element of a bearing, a sensor containing a magnetic body, a stay for a sensor or the like, a fastening member such as a bolt, a reinforcing ring member (ring plate), and the like.

The region R1*a* is a region between the inner peripheral ends of the plurality of outer pole magnets 33 and the outer peripheral ends of the plurality of inner pole magnets 31*a* in the radial direction, and corresponds to a region in which a distance from the magnetic pole pieces 32*a* in the axial direction is X mm. The X mm is preferably 8 mm, and more preferably 3 mm.

The region R1 corresponds to a region inside the magnetic modulation gear 30 and between the inner peripheral ends of the plurality of outer pole magnets 33 and the outer peripheral ends of the plurality of inner pole magnets 31*a* in the radial direction. The inside of the magnetic modulation gear 30 means an inner side with respect to the outer surface of the magnetic modulation gear 30 (the surfaces exposed to the outside of the casing 10, the load-side cover 11, the counter load-side cover 12, the shaft member 32*b*, and the shaft 21*a*).

With such a magnetic body disposition structure 1, it is possible to suppress a situation in which the magnetic body part draws in the magnetic flux leaking from between the outer pole magnet 33, the magnetic pole piece 32*a*, and the inner pole magnet 31*a*, thereby causing a large loss.

Magnetic Body Disposition Structure 2

The bearing (corresponding to a first bearing) 13*c* closest to the magnetic pole piece 32*a* on the load side, among the bearings 13*a*, 13*c*, and 13*d* that rotatably support the low speed rotor 32, is disposed outside the region R1. In other words, the bearing 13*c* is located within a region outward in the radial direction with respect to the inner peripheral ends of the plurality of outer pole magnets 33 or within a region inward in the radial direction with respect to the outer peripheral ends of the plurality of inner pole magnets 31*a*. In the example of FIG. 1, the bearing 13*c* is located within a region inward in the radial direction with respect to the outer peripheral ends of the plurality of inner pole magnets 31*a*.

Further, the bearing 13*c* is fitted to an outer peripheral surface S2 of a second step which is located one step inward from an outer peripheral surface S3 of the magnetic pole piece 32*a*, among a plurality of steps of outer peripheral surfaces S1 to S4 of the low speed rotor 32.

With such a configuration, it is possible to suppress a situation in which on the load side of the magnetic pole piece 32*a*, the bearing 13*c* draws in the magnetic flux leaking from between the outer pole magnet 33, the magnetic pole piece 32*a*, and the inner pole magnet 31*a*, thereby causing a loss. Further, the bearing 13*c* can be disposed at a location not far away from the inner pole magnet 31*a* and the outer pole magnet 33 in the axial direction, and the magnetic modulation gear 30 can be made more compact in the axial direction.

The bearing (corresponding to a second bearing) 13*d* closest to the magnetic pole piece 32*a* on the counter load side, among the bearings 13*a*, 13*c*, and 13*d* that rotatably support the low speed rotor 32, is also disposed outside the region R1. In other words, the bearing 13*d* is located within a region outward in the radial direction with respect to the inner peripheral ends of the plurality of outer pole magnets 33 or within a region inward in the radial direction with respect to the outer peripheral ends of the plurality of inner pole magnets 31*a*. In the example of FIG. 1, the bearing 13*d* is located within a region outward in the radial direction with respect to the inner peripheral ends of the plurality of outer pole magnets 33.

Further, the bearing 13*d* is fitted to the outer peripheral surface S4 of a fourth step which is located one step outward from the outer peripheral surface S3 of the magnetic pole piece 32*a*, among the plurality of steps of outer peripheral surfaces S1 to S4 of the low speed rotor 32. The bearing 13*d* may be disposed at an axial position that overlaps the region R1*a* when viewed from the radial direction.

With such a configuration, even on the counter load side of the magnetic pole piece 32*a*, it is possible to suppress a situation in which the bearing 13*d* draws in the magnetic flux leaking from between the outer pole magnet 33, the magnetic pole piece 32*a*, and the inner pole magnet 31*a*, thereby causing a loss. Further, the bearing 13*d* can be disposed at a location not far away from the magnetic pole piece 32*a* in the axial direction, and the magnetic modulation gear 30 can be made more compact in the axial direction.

Only one of the bearing 13*c* on the load side and the bearing 13*d* on the counter load side may be disposed so as not to overlap the region R1, and even in that case, the effect capable of suppressing the occurrence of a loss in the one can be exhibited.

Magnetic Body Disposition Structure 3

Here, a case is assumed where the material of the shaft member 32b of the low speed rotor 32 is a magnetic body such as steel. The shaft member 32b, which is a magnetic body, is connected to the magnetic pole piece 32a through the extension portion 32c1, which is a non-magnetic body, so that the shaft member 32b, which is a magnetic body, is disposed so as not to overlap the region R1 or the region R1a.

With such a configuration, it is possible to suppress a situation in which the shaft member 32b, which is a magnetic body, draws in the magnetic flux leaking from between the outer pole magnet 33, the magnetic pole piece 32a, and the inner pole magnet 31a, thereby causing a loss.

Magnetic Body Disposition Structure 4

Here, a case is assumed where the ring member 32g of the low speed rotor 32 is a magnetic body such as steel. The ring member 32g, which is a magnetic body, is fixed to the extension portion 32c2, which is a non-magnetic body, so that the ring member 32g, which is a magnetic body, is disposed so as not to overlap the region R1 or the region R1a.

With such a configuration, it is possible to suppress a situation in which the ring member 32g, which is a magnetic body, draws in the magnetic flux leaking from between the outer pole magnet 33, the magnetic pole piece 32a, and inner pole magnet 31a, thereby causing a loss.

Gear Motor

Figure 5:
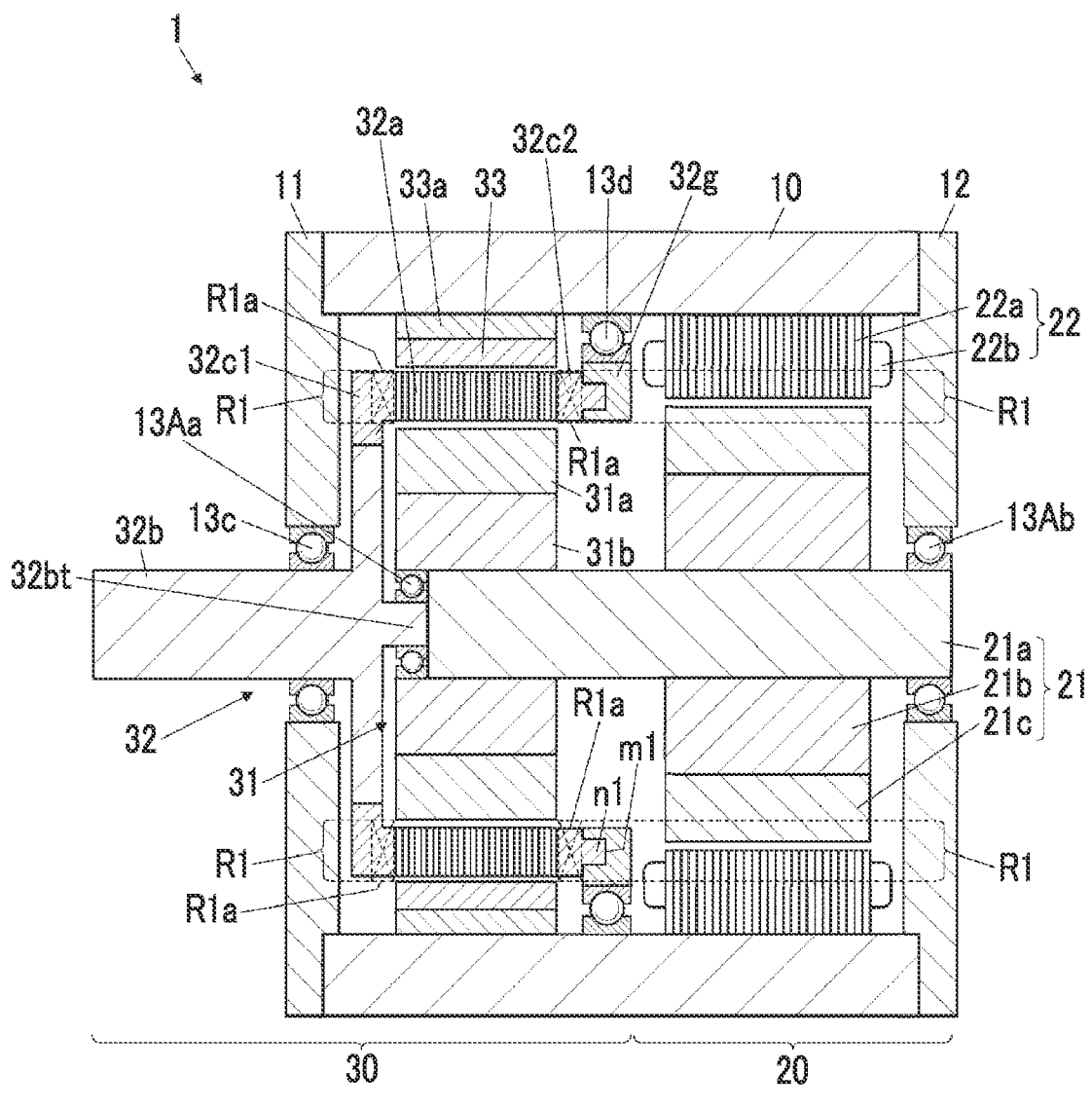
FIG. 5 is a sectional view showing a gear motor according to the embodiment of the present invention.

FIG. 5 is a sectional view showing a gear motor according to the embodiment of the present invention. A gear motor 1 of the present embodiment includes a motor (electric motor) 20 that outputs rotational power, the magnetic modulation gear 30 that receives the rotational power of the motor 20, the casing 10 that accommodates the motor 20 and the magnetic modulation gear 30, the load-side cover 11, and the counter load-side cover 12.

The motor 20 includes a motor rotor 21 and a motor stator 22. As described above, the magnetic modulation gear 30 includes the high speed rotor 31, the low speed rotor 32, and the plurality of outer pole magnets 33. The rotation axis of the motor 20 and the rotation axis of the magnetic modulation gear 30 overlap on the center axis Ax. The motor 20 and the magnetic modulation gear 30 are disposed side by side in the axial direction.

The motor rotor 21 includes the shaft 21a, a rotor yoke 21b, and a rotor magnet 21c. The rotor yoke 21b is made of a magnetic body and is fixed to the outer peripheral surface of the shaft 21a. The rotor magnet 21c is, for example, a permanent magnet such as a neodymium magnet, and a plurality of rotor magnets 21c corresponding to a predetermined number of poles are attached to the portion located on the inner diameter side of the motor stator 22, of the outer peripheral surface of the rotor yoke 21b.

The motor stator 22 is configured by winding a coil 22b around a stator core 22a made of laminated steel sheets. The motor stator 22 is disposed concentrically on the outer diameter side of the motor rotor 21, and is held in the casing 10 in a state where the stator core 22a is fitted inside casing 10.

The magnetic modulation gear 30 is configured in substantially the same manner as that in the embodiment shown in FIG. 1, except that the bearing structure is partially different. In the gear motor 1, the shaft 21a of the magnetic modulation gear 30 and the shaft 21a of the motor rotor 21 are shared, and extend in the axial direction from the motor 20 to the magnetic modulation gear 30. The ring member 32g has an annular fitting groove ml recessed in the axial direction, and the extension portion 32c2 has an annular protrusion portion n1 corresponding to the fitting groove ml. Then, the ring member 32g and the extension portion 32c2 are joined together by fitting the protrusion portion n1 into the fitting groove ml.

The gear motor 1 further includes bearings 13Aa and 13Ab that rotatably support the high speed rotor 31 of the magnetic modulation gear 30 and the motor rotor 21, and the bearings 13Aa, 13c, 13d that rotatably support the low speed rotor 32 of the magnetic modulation gear 30. The bearings 13Aa, 13Ab, 13c, and 13d are ball bearings. However, various types of bearings such as roller bearings and tapered roller bearings may be applied.

The bearing 13Aa is fitted between the shaft member 32b of the low speed rotor 32 and the high speed rotor 31, and rotatably supports the high speed rotor 31 with respect to the low speed rotor 32, while rotatably supporting the low speed rotor 32 with respect to the high speed rotor 31. More specifically, the shaft member 32b has a protrusion portion 32bt that protrudes toward the counter load side, and a recessed portion that is open in the axial direction is provided in the end portion on the load side of the high speed rotor 31. Further, the protrusion portion 32bt extends into the recessed portion of the high speed rotor 31, and the bearing 13Aa is fitted between the outer peripheral surface of the protrusion portion 32bt and the inner peripheral surface of the recessed portion.

The bearing 13Ab is fitted between the shaft 21a and the counter load-side cover 12 connected to the casing 10, and rotatably supports the shaft 21a with respect to the casing 10.

The bearing 13c is fitted between the load-side cover 11 connected to the casing 10 and the shaft member 32b of the low speed rotor 32, and rotatably supports the shaft member 32b with respect to the casing 10.

The bearing 13d is fitted between the casing 10 and the ring member 32g of the low speed rotor 32, and rotatably supports the counter load side of the low speed rotor 32 with respect to the casing 10.

Each of the bearings 13Aa, 13Ab, 13c, and 13d has an outer ring, an inner ring, and rolling elements. The material for the outer ring, the inner ring, and the rolling element is a magnetic body (ferromagnetic body) such as steel. With such a material, high durability of the bearings 13Aa, 13Ab, 13c, and 13d can be obtained, and a property of drawing in a magnetic flux is generated.

Operation of Gear Motor

In the gear motor 1, the motor 20 is driven, so that rotational power is output to the motor rotor 21, the rotational power is input to the magnetic modulation gear 30, and the rotating motion is decelerated by the operation of the magnetic modulation gear 30 described above and output through the low speed rotor 32.

Disposition of Magnetic Body

Also in the gear motor 1, among the bearings 13Aa, 13c, and 13d that support the low speed rotor 32, the bearing 13c closest to the magnetic pole pieces 32a on the load side with respect to the magnetic pole pieces 32a, and the bearing 13d closest to the magnetic pole pieces 32a on the counter load side with respect to the magnetic pole pieces 32a are disposed outside the region R1. In other words, the bearings 13c and 13d are located within a region outward in the radial direction with respect to the inner peripheral ends of the plurality of outer pole magnets 33 or within a region inward in the radial direction with respect to the outer peripheral ends of the plurality of inner pole magnets 31a. In the example of FIG. 1, the bearing 13c is located within a region inward in the radial direction with respect to the outer peripheral ends of the plurality of inner pole magnets 31a. Further, the bearing 13d is located within a region outward in the radial direction with respect to the inner peripheral ends of the plurality of outer pole magnets 33.

Further, as a part made of magnetic body that is included in the gear motor 1, a part having an axial dimension of 5 mm or more is disposed outside the region R1a. The region R1a is a region between the inner peripheral ends of the plurality of outer pole magnets 33 and the outer peripheral ends of the plurality of inner pole magnets 31a in the radial direction, and corresponds to a region in which a distance from the magnetic pole pieces 32a in the axial direction is X mm. The X mm is preferably 8 mm, and more preferably 3 mm.

More specifically, the rotor yoke 21b, the rotor magnet 21c, and the stator core 22a of the motor 20 are magnetic bodies, and are disposed outside the region R1a. Further, the ring member 32g, which is a magnetic body, is disposed outside the region R1a.

With the disposition of the bearings 13Aa, 13Ab, 13c, and 13d and the disposition of the magnetic body part as described above, it is possible to suppress a situation in which the bearings 13Aa, 13Ab, 13c, and 13d or the magnetic body part draws in the magnetic flux leaking from between the outer pole magnet 33, the magnetic pole piece 32a, and the inner pole magnet 31a, thereby causing a loss. Further, by adopting the above-described structure as the disposition structure of the bearing 13Aa that is interposed between the high speed rotor 31 and the low speed rotor 32, the bearings 13Aa and 13c on the load side in the axial direction can be disposed close to the inner pole magnet 31a and the outer pole magnet 33. With the disposition, the magnetic modulation gear 30 and the gear motor 1 can be made more compact in the axial direction.

The bearings 13c and 13d may be disposed at axial positions that overlap the region R1a when viewed from the radial direction. With such disposition, the magnetic modulation gear 30 and the gear motor 1 can be made more compact in the axial direction.

MODIFICATION EXAMPLES

Subsequently, Modification Examples 1 to 8 will be described with reference to FIGS. 6A to 8B. In FIGS. 6A to 8B, the outer pole magnet 33, the low speed rotor 32, and the inner pole magnet 31a are mainly shown, and illustration of some other parts is omitted. The magnetic modulation gears of Modification Examples 1 to 8 shown in FIGS. 6A to 8B may be configured to include other parts, similar to the magnetic modulation gear 30 in FIG. 1 or the gear motor 1 in FIG. 5.

Modification Examples 1 to 3

Figure 6A:
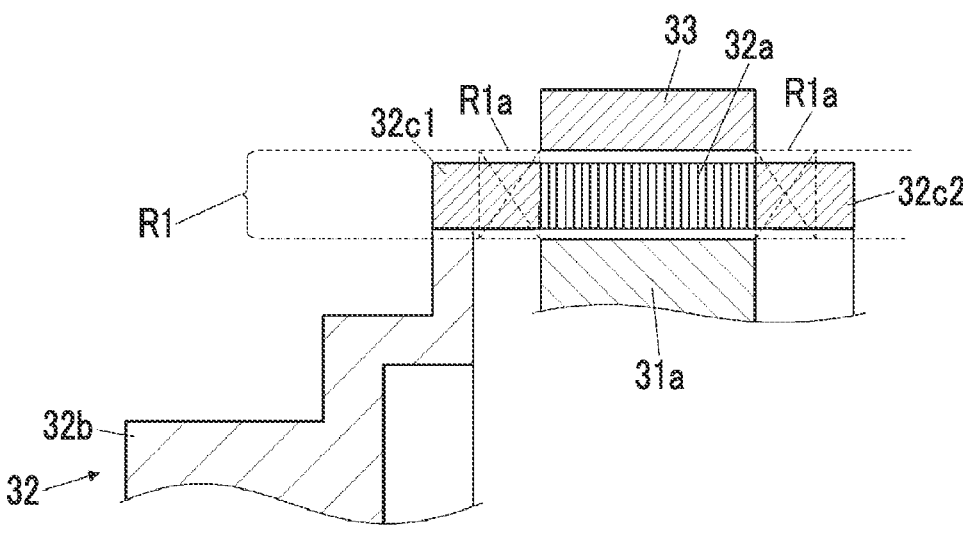
FIG. 6A is a diagram showing Modification Example 1 of a connection portion of a shaft member.
Figure 6B:
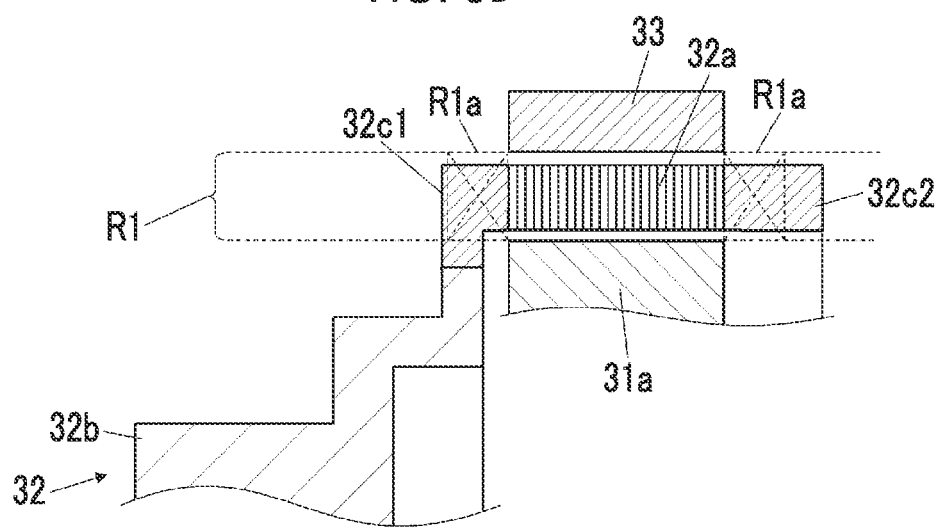
FIG. 6B is a diagram showing Modification Example 2 of the connection portion of the shaft member.
Figure 6C:
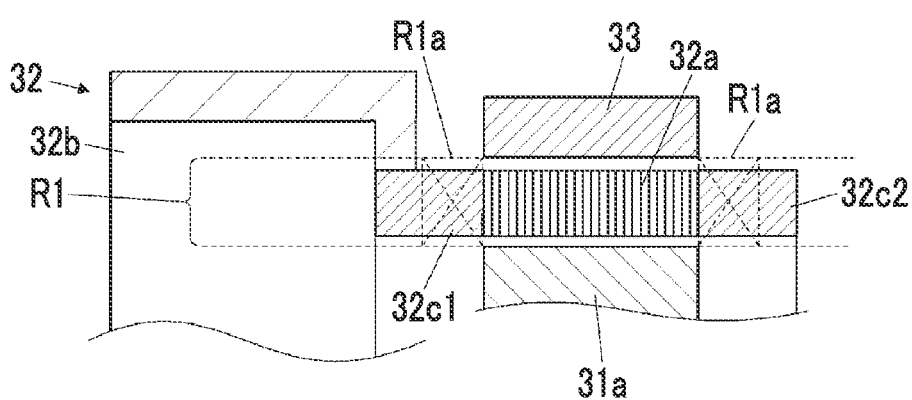
FIG. 6C is a diagram showing Modification Example 3 of the connection portion of the shaft member.

FIGS. 6A to 6C are diagrams showing modification examples of the connection portion of the shaft member, in which FIG. 6A shows Modification Example 1, FIG. 6B shows Modification Example 2, and FIG. 6C shows Modification Example 3. In Modification Examples 1 to 3, the shaft member 32b is made of a magnetic body such as steel, and the extension portions 32c1 and 32c2 are made of a non-magnetic body.

Modification Example 1 (FIG. 6A) is an example in which the connection portion between the shaft member 32b and the extension portion 32c1 is spaced apart from the magnetic pole piece 32a in the axial direction by lengthening the extension portion 32c1 in the axial direction. With such a configuration, one end portion (the portion that is connected to the extension portion 32c1) of the shaft member 32b, which is a magnetic body, can be disposed to overlap the region R1 but to be away from the region R1a where a relatively large loss occurs.

According to Modification Example 1, one end portion of the shaft member 32b is disposed outside the region R1a, so that a decrease in the torque and efficiency of the magnetic modulation gear can be suppressed. Further, the shape of the extension portion 32c1 can be simplified, so that the effect that the extension portion 32c1 can be easily formed can be obtained.

Modification Example 2 (FIG. 6B) is an example in which at least a portion of the extension portion 32c1 is shaped to project in the radial direction and the shaft member 32b is connected to the projecting portion. With such a configuration, one end portion (the portion that is connected to the extension portion 32c1) of the shaft member 32b, which is a magnetic body, can be disposed outside the region R1.

According to Modification Example 2, one end portion of the shaft member 32b is disposed outside the region R1, so that a decrease in the torque and efficiency of the magnetic modulation gear can be suppressed. Further, that one end portion of the shaft member 32b can be brought closer to the magnetic pole piece 32a in the axial direction, so that the effect of contributing to making the magnetic modulation gear made more compact in the axial direction can be obtained.

Modification Example 3 (FIG. 6C) is an example in which the maximum outer diameter of the shaft member 32b is larger than the outer diameter of the magnetic pole piece 32a and the shaft member 32b is connected from the outside in the radial direction of the extension portion 32c1. Even in such a configuration, as shown in FIG. 6C, it is possible to configure the extension portion 32c1 to be long in the axial direction, and to separate the connection portion between the shaft member 32b and the extension portion 32c1 from the extension portion 32c1 in the axial direction. With this configuration, one end portion (the portion that is connected to the extension portion 32c1) of the shaft member 32b can be disposed outside the region R1a, so that a decrease in the torque and efficiency of the magnetic modulation gear can be suppressed. Further, the shape of the extension portion 32c1 can be simplified, so that the effect that the extension portion 32c1 can be easily formed can be obtained.

Further, although illustration is omitted, at least a portion of the extension portion 32c1 may be shaped to project outward in the radial direction and the shaft member 32b may be connected to the projecting portion. With such a configuration, one end portion (the portion that is connected to the extension portion 32c1) of the shaft member 32b, which is a magnetic body, can be disposed outside the region R1. According to this configuration, one end portion of the shaft member 32b can be brought closer to the magnetic pole piece 32a in the axial direction while suppressing a decrease in the torque and efficiency of the magnetic modulation gear, so that the effect of contributing to making the magnetic modulation gear more compact in the axial direction can be obtained.

Modification Examples 4 to 6

Figures 7A, 7B, 7C:
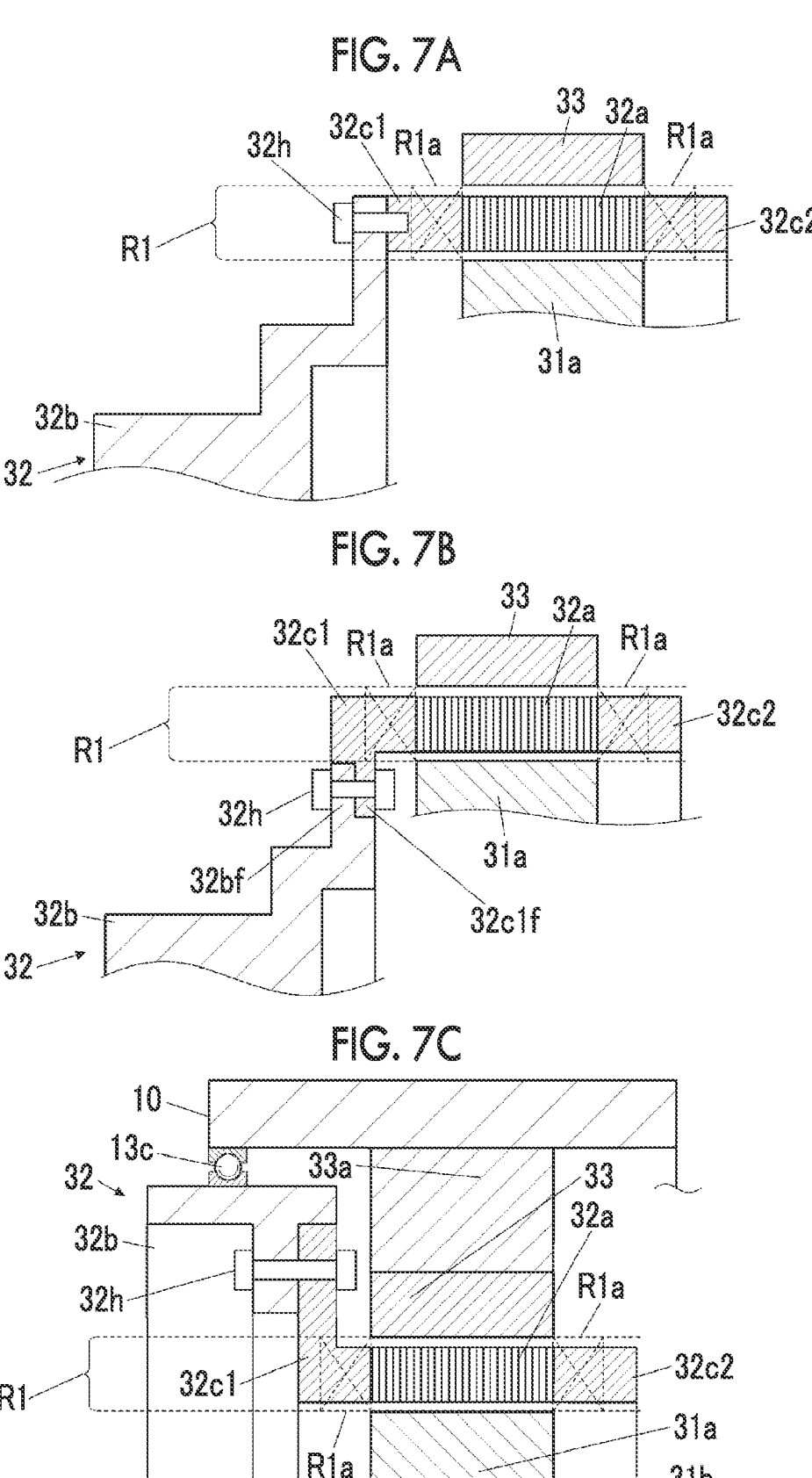
FIG. 7A is a diagram showing Modification Example 4 of a connection structure of the shaft member.
FIG. 7B is a diagram showing Modification Example 5 of the connection structure of the shaft member.
FIG. 7C is a diagram showing Modification Example 6 of the connection structure of the shaft member.

FIGS. 7A to 7C are diagrams showing modification examples of the connection structure of the shaft member, in which FIG. 7A shows Modification Example 4, FIG. 7B shows Modification Example 5, and FIG. 7C shows Modification Example 6. In Modification Examples 4 to 6, the shaft member 32b and the extension portion 32c1 are connected to each other through a connection member 32h such as a bolt. The connection member 32h is made of a magnetic body, and the extension portion 32c1 is made of a non-magnetic body. The shaft member 32b may be a non-magnetic body or may be a magnetic body.

Modification Example 4 (FIG. 7A) is an example in which the shaft member 32b is connected to an end portion in the axial direction of the extension portion 32c1 through the connection member 32h. By lengthening the extension portion 32c1 in the axial direction, the connection member 32h is spaced apart from the magnetic pole piece 32a in the axial direction. With such a configuration, the connection member 32h, which is a magnetic body, can be disposed to overlap the region R1 but to be away from the region R1a where a relatively large loss occurs.

According to Modification Example 4, the connection member 32h is disposed outside the region R1a, so that a decrease in the torque and efficiency of the magnetic modulation gear can be suppressed. Further, the effect can be obtained that the shape of the extension portion 32c1 can be simplified and the shaft member 32b and the extension portion 32c1 can be easily connected.

Modification Example 5 (FIG. 7B) is an example in which at least a portion of the extension portion 32c1 is shaped to project in the radial direction and the shaft member 32b is connected to the projecting portion through the connection member 32h. The connection portion of the shaft member 32b has a flange 32bf whose thickness in the axial direction is reduced in a stepwise manner, and the projecting portion of the extension portion 32c1 has a flange 32c1f whose thickness in the axial direction is reduced in a stepwise manner. Then, the two flanges 32bf and 32c1f are overlapped and tightened in the axial direction by the connection member 32h. With such a configuration, the connection member 32h, which is a magnetic body, can be disposed outside the region R1.

According to Modification Example 5, the connection member 32h is disposed outside the region R1, so that a decrease in the torque and efficiency of the magnetic modulation gear can be suppressed. Further, the connection portion of the shaft member 32b including the connection member 32h can be brought closer to the magnetic pole piece 32a in the axial direction, so that the effect of contributing to making the magnetic modulation gear more compact in the axial direction can be obtained.

Modification Example 6 (FIG. 7C) is an example in which the maximum outer diameter of the shaft member 32b is larger than the outer diameter of the magnetic pole piece 32a and the shaft member 32b is connected to the radially outer side of the extension portion 32c1. Even in such a configuration, it is possible to adopt a configuration in which at least a portion of the extension portion 32c1 is shaped to project outward in the radial direction and the shaft member 32b is connected to the projecting portion through the connection member 32h. According to this configuration, by disposing the connection member 32h outside the region R1, it is possible to bring the connection portion of the shaft member 32b closer to the magnetic pole piece 32a in the axial direction while suppressing a decrease in the torque and efficiency of the magnetic modulation gear, so that the effect of contributing to making the magnetic modulation gear more compact in the axial direction can be obtained.

Further, although illustration is omitted, even in a configuration in which the shaft member 32b has a large outer diameter, a configuration may be adopted in which by configuring the extension portion 32c1 to be long in the axial direction, the connection portion between the shaft member 32b and the extension portion 32c1 and the connection member 32h are spaced apart from the magnetic pole piece 32a in the axial direction. Even in such a configuration, the connection member 32h is disposed outside the region R1a, so that a decrease in the torque and efficiency of the magnetic modulation gear can be suppressed. Further, according to such a configuration, the effect can be obtained that the shape of the extension portion 32c1 can be simplified and the shaft member 32b and the extension portion 32c1 can be easily connected.

Modification Examples 7 and 8

Figure 8A:
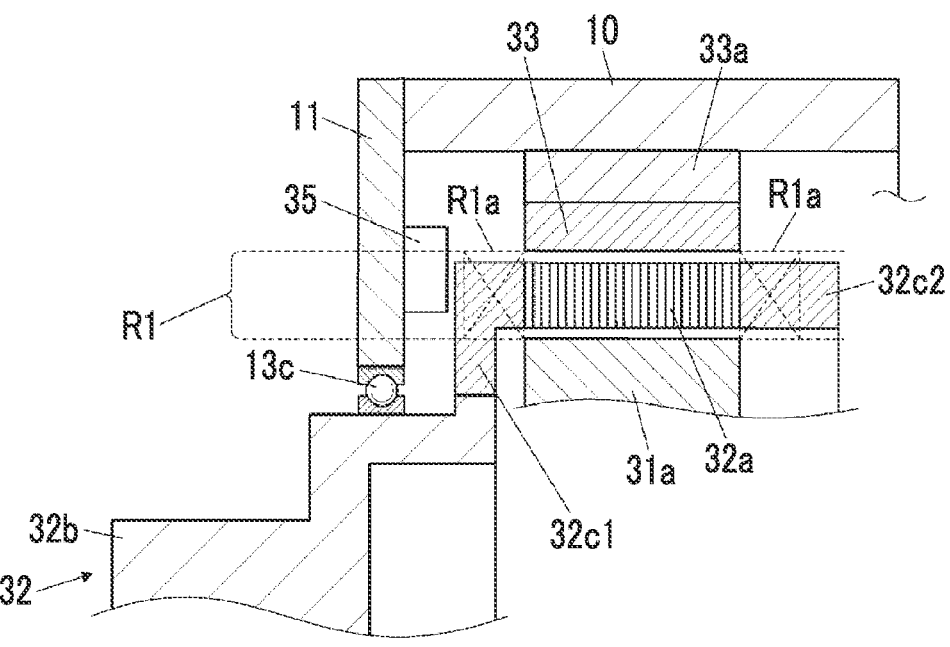
FIG. 8A is a diagram showing Modification Example 7 that includes another magnetic body part.
Figure 8B:
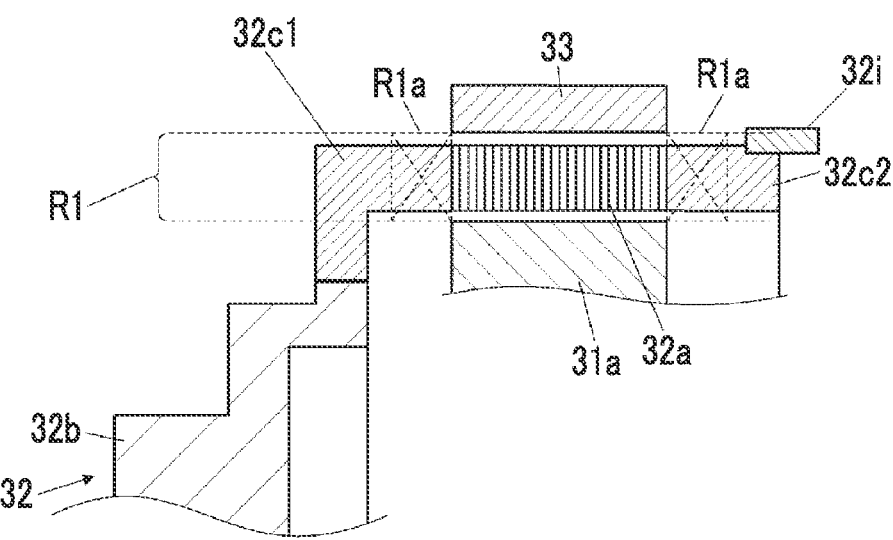
FIG. 8B is a diagram showing Modification Example 8 that includes another magnetic body part.

FIGS. 8A and 8B are diagrams showing modification examples including other magnetic body parts, in which FIG. 8A shows Modification Example 7 and FIG. 8B shows Modification Example 8.

Modification Example 7 (FIG. 8A) is an example in which a sensor 35 that includes a magnetic body is provided in the vicinity of the low speed rotor 32. The sensor 35 is, for example, an encoder that detects rotation. However, various sensors such as a temperature sensor may be adopted. The sensor 35 can face a detection target, which is a portion that moves at the same speed as the magnetic pole piece 32a, from the axial direction with the extension portion 32c1 interposed therebetween, while being spaced apart from the magnetic pole piece 32a in the axial direction. With such a configuration, the sensor 35 including a magnetic body can be disposed so as to overlap the region R1 but to be away from the region R1a. Then, a loss and a decrease in the torque of the magnetic modulation gear can be suppressed.

Modification Example 8 (FIG. 8B) is an example in which a plate member 32i, which is a magnetic body, is provided on the extension portion 32c2. The plate member 32i may be a member for any purpose, such as a reinforcing member or a non-detection member for magnetically performing rotation detection. The plate member 32i may be a member that is fixed to the extension portion 32c2 in a partial range in the circumferential direction, or may be an annular member that is located over the entire circumference in the circumferential direction. The plate member 32i can be spaced apart from the magnetic pole piece 32a in the axial direction by being fixed to the extension portion 32c2. With this configuration, the plate member 32i, which is a magnetic body, can be disposed outside the region R1a, so that a loss and a decrease in the torque of the magnetic modulation gear can be suppressed.

The embodiment of the present invention has been described above. However, the present invention is not limited to the embodiment described above. For example, in the embodiment described above, the magnetic modulation gear 30 that decelerates or speeds up the rotating motion by rotating the low speed rotor 32 and the high speed rotor 31 has been described. However, a configuration may also be adopted in which a plurality of magnetic pole pieces are fixed, a plurality of inner pole magnets are integrated with a high speed shaft, and a plurality of outer pole magnets are integrated with a low speed shaft. Even in this case, since a configuration integrated with the plurality of magnetic pole pieces rotates relative to the inner pole magnets and the outer pole magnets, the configuration can be regarded as a rotor having a plurality of magnetic pole pieces. Further, the number and disposition of bearings shown in the embodiment described above can be changed in various ways, and, for example, the bearing that rotatably supports the low speed rotor may be provided only on one side of the load side and the counter load side with respect to the magnetic pole piece. In addition, the details shown in the embodiment can be appropriately changed within a scope which does not depart from the concept of the invention.

Further, the present invention can be suitably applied to various general industrial machines due to the features such as high efficiency, minimal maintenance, quietness (low noise), and cleanliness (oil-free). In particular, it is highly useful for the following applications.

Gear for robot joint: It has high safety or a compliance function due to a torque limit function using the magnetic modulation gear or low stiffness.

Speed-up gear for power generation: Since it has a torque limit function, an unreasonable load is not applied even during a high load such as during strong wind in wind power generation. Usefulness of minimal maintenance is high.

Vacuum apparatus (semiconductor manufacturing apparatus): With use in magnetic coupling applications, a deceleration function and a coupling function can be exhibited independently, and a deceleration gear can be unnecessary (or an input motor can be made smaller). Therefore, the apparatus can be made more compact.

Food machinery: Usefulness is high in terms of hygiene management because of features such as greaseless (oil-free), no abrasion powder of a shaft seal (oil seal), easy disassembly of a shaft structure, and easy internal cleaning.

Office/home equipment: A quiet indoor space can be secured because of a feature such as low vibration noise due to non-contact power transmission.

The present invention can be utilized for a magnetic modulation gear and a gear motor.

It should be understood that the invention is not limited to the above-described embodiment, but may be modified into various forms on the basis of the spirit of the invention. Additionally, the modifications are included in the scope of the invention.

What is claimed is:

1. A magnetic modulation gear comprising:
a plurality of outer pole magnets arranged in a circumferential direction;
a rotor that includes a plurality of magnetic pole pieces arranged in the circumferential direction on an inner side in a radial direction with respect to the plurality of outer pole magnets;
a plurality of inner pole magnets arranged in the circumferential direction on an inner side in the radial direction with respect to the plurality of magnetic pole pieces; and
one or a plurality of bearings that support the rotor to be rotatable relative to the outer pole magnets or the inner pole magnets,
wherein the one or plurality of bearings include at least one one-side bearing that is located on one side in an axial direction with respect to the plurality of magnetic pole pieces,
a first bearing closest to the magnetic pole pieces, of the at least one one-side bearing, is disposed within a region outward in the radial direction with respect to inner peripheral ends of the plurality of outer pole magnets, or within a region inward in the radial direction with respect to outer peripheral ends of the plurality of inner pole magnets, the rotor includes
an extension portion that extends in the axial direction from the magnetic pole piece, wherein the extension portion is a non-magnetic body, and
a shaft member connected to the extension portion, wherein the shaft member is a magnetic body, and
a connection portion between the extension portion and the shaft member is located within a region in which a region outward in the radial direction with respect to the inner peripheral ends of the plurality of outer pole magnets, a region inward in the radial direction with respect to the outer peripheral ends of the plurality of inner pole magnets, and a region separated by 3 mm or more in the axial direction from the magnetic pole pieces are combined.

2. The magnetic modulation gear according to claim 1, wherein the one or plurality of bearings further include at least one other-side bearing that is located on the other side in the axial direction with respect to the plurality of magnetic pole pieces, and
a second bearing closest to the magnetic pole pieces, of the at least one other-side bearing, is also disposed within a region outward in the radial direction with respect to the inner peripheral ends of the plurality of outer pole magnets, or within a region inward in the radial direction with respect to the outer peripheral ends of the plurality of inner pole magnets.

3. A gear motor comprising:
an electric motor; and
the magnetic modulation gear according to claim 1, which receives power from the electric motor.

4. The magnetic modulation gear according to claim 1, wherein the rotor further includes a ring member mounted on the extension portion,
the ring member is a magnetic body, and
the ring member is located within a region in which a region outward in the radial direction with respect to the inner peripheral ends of the plurality of outer pole magnets, a region inward in the radial direction with respect to the outer peripheral ends of the plurality of inner pole magnets, and a region separated by 3 mm or more in the axial direction from the magnetic pole pieces are combined.

5. A magnetic modulation gear comprising:
a plurality of outer pole magnets arranged in a circumferential direction;
a rotor that includes a plurality of magnetic pole pieces arranged in the circumferential direction on an inner side in a radial direction with respect to the plurality of outer pole magnets;
a plurality of inner pole magnets arranged in the circumferential direction on an inner side in the radial direction with respect to the plurality of magnetic pole pieces; and
one or a plurality of bearings that support the rotor to be rotatable relative to the outer pole magnets or the inner pole magnets,
wherein the one or plurality of bearings include at least one one-side bearing that is located on one side in an axial direction with respect to the plurality of magnetic pole pieces,
a first bearing closest to the magnetic pole pieces, of the at least one one-side bearing, is disposed within a region outward in the radial direction with respect to inner peripheral ends of the plurality of outer pole magnets, or within a region inward in the radial direction with respect to outer peripheral ends of the plurality of inner pole magnets, the rotor includes an extension portion that extends in the axial direction from the magnetic pole piece, wherein the extension portion is a non-magnetic body, and a ring member mounted on the extension portion, wherein the ring member is a magnetic body, and the ring member is located within a region in which a region outward in the radial direction with respect to the inner peripheral ends of the plurality of outer pole magnets, a region inward in the radial direction with respect to the outer peripheral ends of the plurality of inner pole magnets, and a region separated by 3 mm or more in the axial direction from the magnetic pole pieces are combined.

6. A gear motor comprising:

an electric motor; and the magnetic modulation gear according to claim 5, which receives power from the electric motor.

* * * * *